E. W. BURGESS.
TILLAGE IMPLEMENT.
APPLICATION FILED MAY 8, 1916.

1,388,930.

Patented Aug. 30, 1921.
3 SHEETS—SHEET 1.

Inventor.
Edward W. Burgess,
By Chas. E. Lord, Atty.

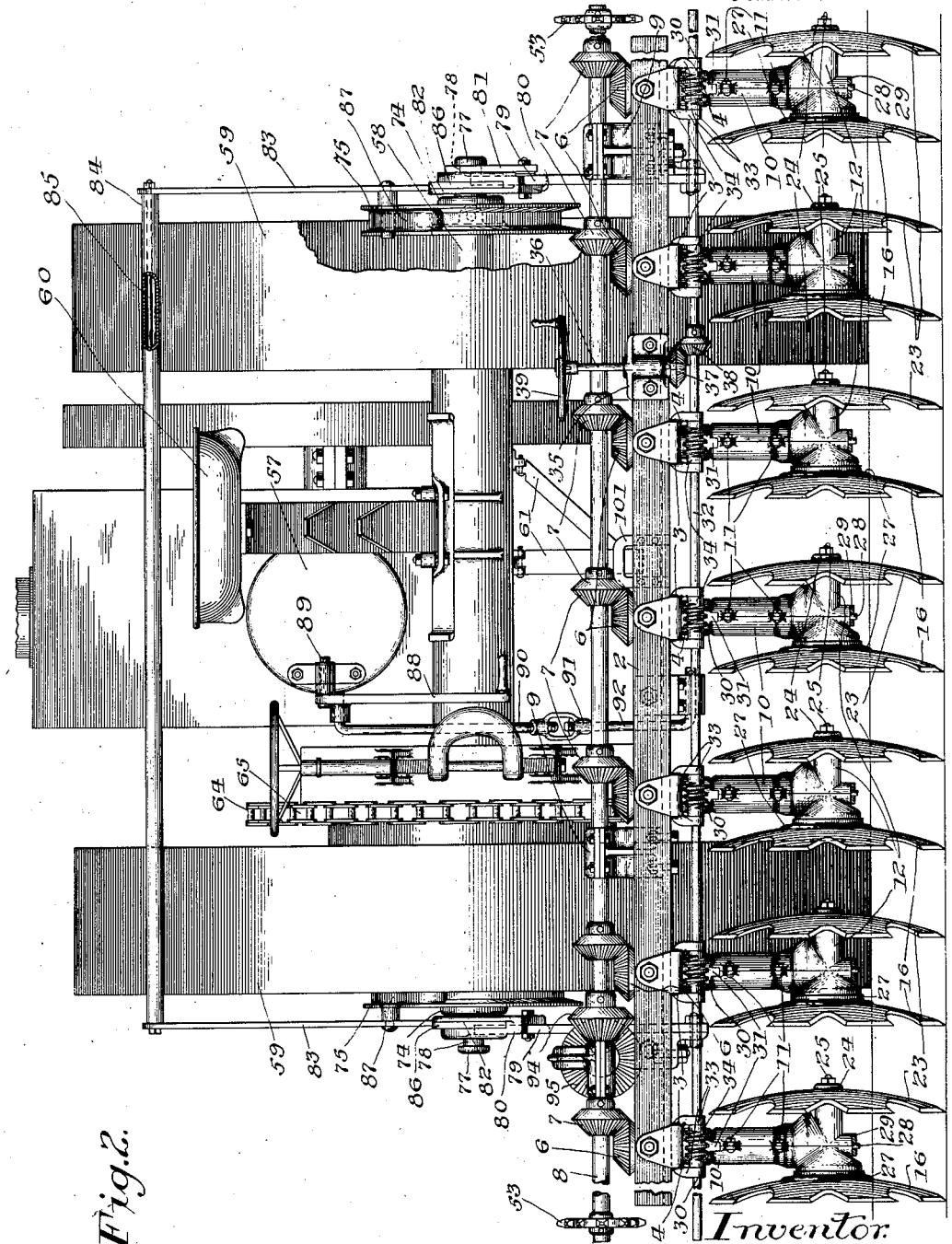

E. W. BURGESS.
TILLAGE IMPLEMENT.
APPLICATION FILED MAY 8, 1916.
1,388,930.
Patented Aug. 30, 1921.
3 SHEETS—SHEET 3.
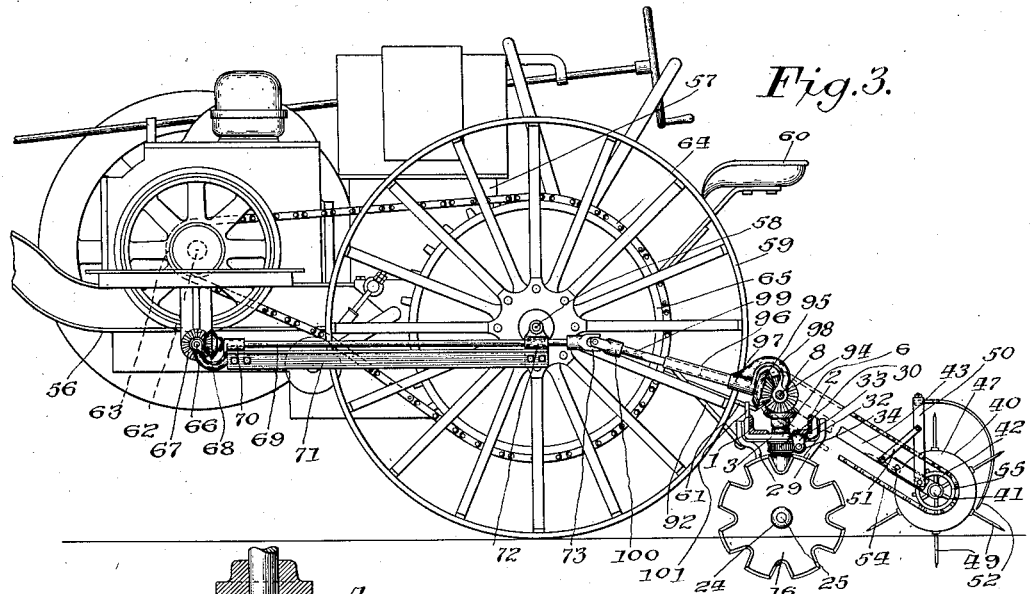
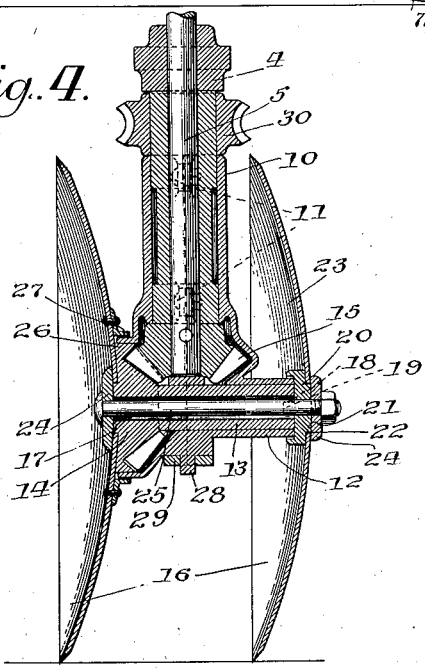
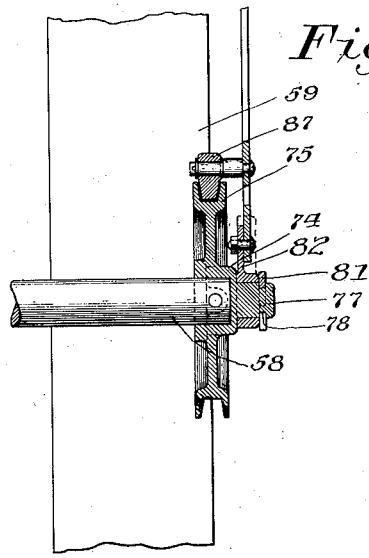
Inventor.
Edward W. Burgess,
By Chas. E. Lord
Atty.

UNITED STATES PATENT OFFICE.

EDWARD W. BURGESS, OF CHICAGO, ILLINOIS, ASSIGNOR, BY MESNE ASSIGNMENTS, TO INTERNATIONAL HARVESTER COMPANY, A CORPORATION OF NEW JERSEY.

TILLAGE IMPLEMENT.

1,388,930.   Specification of Letters Patent.   Patented Aug. 30, 1921.

Application filed May 8, 1916. Serial No. 96,074.

*To all whom it may concern:*

Be it known that I, EDWARD W. BURGESS, a citizen of the United States, residing at Chicago, in the county of Cook and State of Illinois, have invented certain new and useful Improvements in Tillage Implements, of which the following is a full, clear, and exact specification.

My invention relates to rotary tillage implements adapted for tractor operation, wherein the cultivating elements are rotated at a greater relative speed than their advance, the object of the invention being to provide an implement of the class indicated that may be readily connected with a tractor in trailing relation in a manner whereby its rotary elements are operatively connected with the power transmission gearing of the tractor independent of its traction wheels and whereby any desired speed of rotation may be transmitted to the cultivating elements, and to provide such an implement with means whereby the implement may be raised from the ground by the draft of the tractor.

These objects are attained by means of the mechanism illustrated in the accompanying drawings, in which—

Fig. 2 is a rear view of part of Fig. 1 with some of the parts of the implement broken away;

Fig. 3 is an opposite side elevation of part of the tractor and a sectional end view of the harrow designed to illustrate the manner of connecting the operative parts of the harrow with the power transmission gearing of the tractor;

Fig. 4 is a vertical sectional detail of part of the disk driving mechanism; and Fig. 5 is a vertical sectional detail of part of the power lift mechanism connected with the axle of the tractor.

Figure 1:
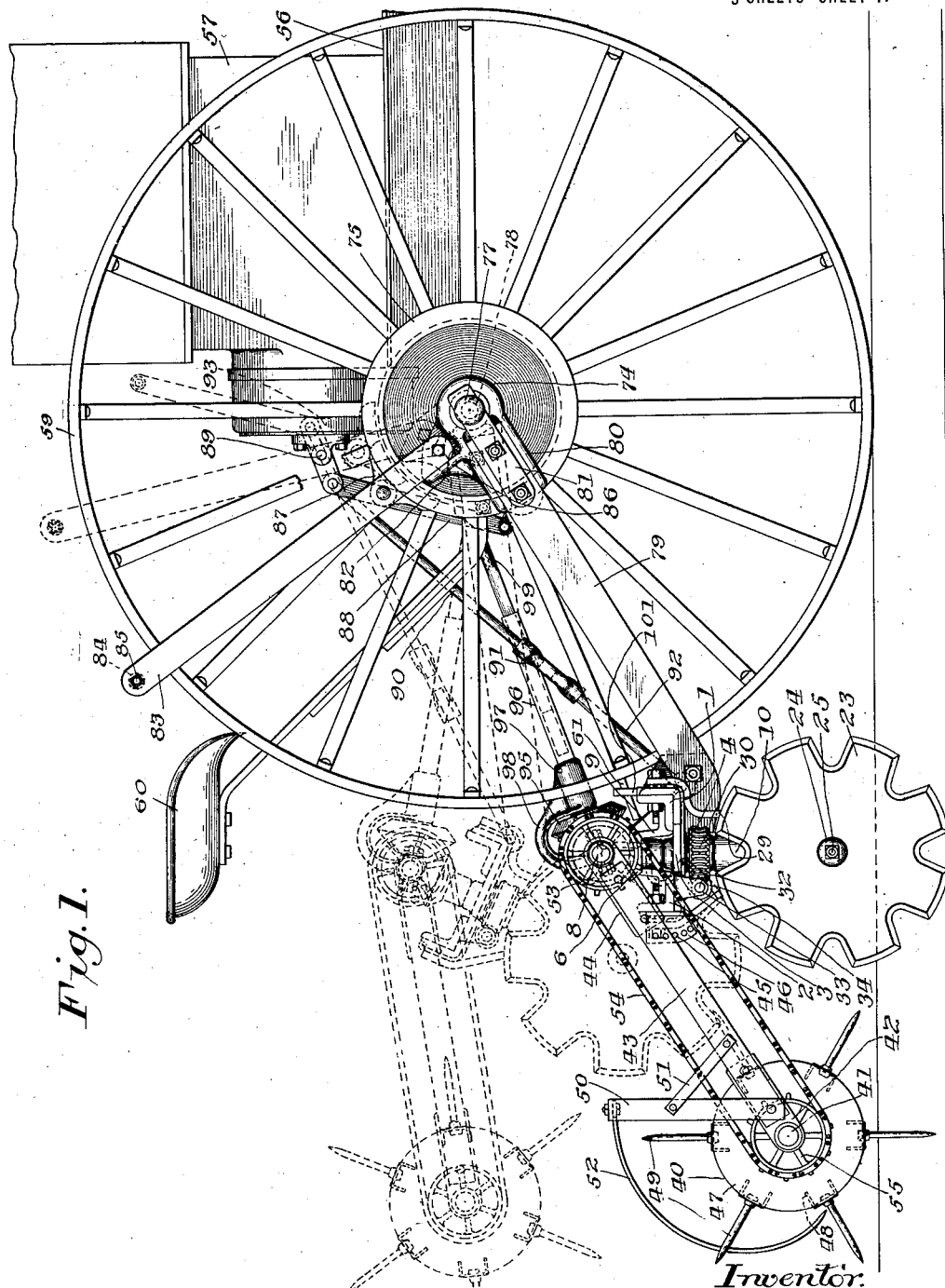
Figure 1 is a side elevation of part of a tractor and an end view of the rotary tillage implement embodying my invention.

Referring to the drawings, wherein the same reference characters designate like parts throughout the several views, the frame of the disk harrow includes front and rear transversely disposed frame members 1 and 2, respectively, having preferably an angle section, the bars being spaced apart and connected by means of a series of bridge members 3, having depending hangers 4, in which are journaled vertically disposed shafts 5, having miter pinions 6 secured to their upper ends that mesh with corresponding pinions 7 secured to a transverse power shaft 8 journaled in bearing members 9 secured to the frame members 1 and 2. Rotatably mounted upon the hangers 4 are sleeve members 10, preferably made in two parts and secured together by means of bolts 11, and provided at their lower ends with horizontally disposed bearing sleeves 12, in which are journaled hollow disk carrying axle members 13, having integral with one end thereof pinions 14 that mesh with corresponding pinions 15 secured to the lower ends of the vertical shafts 5. The outer faces of the pinions have concave forms adapted to receive the convex surface of a disk 16 provided with axial angular openings adapted to receive angular boss members 17 integral with the pinions. The opposite ends of the axle members 13 are provided with radially disposed notches 18 that receive laterally disposed lugs 19 projecting inward from the faces of separable collar members 20, provided upon their opposite sides with angular boss members 21 that are received by corresponding openings 22 in companion disks 23. The disks are secured to the axle members by means of washers 24 and an axial securing bolt 25.

The sleeve members 10 inclose the pinions 14 and 15, and the pinion 14 is provided with a peripheral bearing flange 26 that is journaled in an enlarged axial opening in the adjacent end of the sleeve members, and 27 represents dust excluding rings secured to the disks and rotatable therewith. The sleeve members 10 are provided with axial extensions 28 upon their lower ends that are journaled in the lower ends of truss brackets 29, having their upper ends secured to the frame members 1 and 2. 30 represents worm gears upon the upper ends of the sleeve members 10, that are preferably separate and interlock therewith by means of clutch members 31, 32 a transversely disposed shaft journaled in bearings 33 carried by the rear ends of the bridge members 3, 34 worm gear members secured to the shaft and meshing with the worm gears 30, 35 a vertically disposed bearing box secured to the rear frame member 2, 36 a shaft journaled therein, 37 a like pinion secured to the lower end of the shaft and meshing with a corresponding pinion 38 secured to the shaft 32, and 39 a hand wheel secured to the upper end of the shaft whereby the operator may control the operative angle of the disks relative to the line of draft.

40 represents a trailing smoothing harrow including an axle 41, having its opposite ends journaled in bearing boxes 42 secured to the rear ends of draft bars 43, having secured to their front ends bracket members 44 turnable about the axis of the power shaft 8 and adjustable thereon by means of stop pins 45 selectively received by openings in the rearwardly extending wings 46 integral with the bearing members 9 at opposite ends of the frame members 1 and 2. Secured to the axle are cylinder heads 47, to which are secured transverse tooth carrying channel bars 48, having spike teeth 49 secured thereto. 50 represents a transversely disposed U-shaped frame member carried by the rear ends of the draft bars 43 and supported by means of brace members 51. 52 represents curved stripper members secured to the head of the U-shaped frame member and operative to clear the teeth of any trash that might be lifted in the operation thereof. The smoothing cylinder is turnable from the frame of the disk harrow and is operatively connected therewith by means including sprocket wheels 53 secured to opposite ends of the power shaft 8, and connected by means of sprocket chains 54 with sprocket wheels 55 secured to the opposite ends of the smoothing axle 41 of the smoothing cylinder.

The traction engine includes a truck frame 56, an engine 57, axle 58, traction wheels 59 mounted upon opposite ends of the axle, an operator's seat 60, and a rearwardly extending pivoted draft frame 61 that is permitted a rising and falling movement. The power transmission gearing of the tractor includes an engine shaft 62 carrying a sprocket wheel 63 that is operatively connected with the axle 58 by means of a sprocket chain 64, and a second sprocket wheel 65 mounted upon said axle. 66 represents a transversely disposed countershaft journaled in bearings carried by the truck frame and disposed below the engine shaft, preferably following the construction shown and described in my Patent No. 1,301,811, Aug. 29, 1919, for transmission gearing, wherein a clutch mechanism operatively connects the power transmission gearing of the tractor with the supplemental countershaft. A pinion 67 is secured to the outer end of the countershaft and meshes with a corresponding pinion 68 secured to the front end of a longitudinally disposed side shaft 69 journaled in a bearing member 70 secured to the front end of a supporting bar 71 and turnable about the axis of the countershaft 66, the rear end of the shaft 69 being journaled in a bearing member 72 secured to the rear end of the bar and supported by the tractor axle, and 73 represents a universal coupling member secured to the rear end of the side shaft. Secured to the opposite ends of the tractor axle, and rotatable therewith, are the hub members 74 of friction sheaves 75, the hubs having reduced outer ends 77 provided with circumferential channels 78. 79 represents harrow draft bars having their rear ends connected with the harrow frame, 80 bracket members secured to the front ends of the draft bars, having lateral openings therein adapted to receive the reduced ends 77 of the hub members 74 and carrying pivotally mounted latch members 81 adapted to be received by the channels 78 in a manner to releasably secure the brackets in engagement with the hubs. 82 represents vertically disposed wing members integral with the brackets 80, 83 upwardly extending levers having their lower ends pivotally connected with the wings and their upper ends connected, by means of a transverse pipe member 84, to a securing rod 85 whereby the two levers may be moved simultaneously about their axes, and 86 represents raised portions on the wings limiting a lateral swing of the levers. 87 represents brake shoes pivotally mounted upon the levers and adapted to engage with the friction sheaves 75 in a manner to cause the levers 83 and draft bars 79 to move with the sheaves about the axis of the tractor axle and lift the harrow from the ground when the operator presses forward upon the pipe member 84, and they are retained in an elevated position by means of a toggle mechanism including a hand lever 88 pivoted at 89 to the tractor and having the front end of a link 90 connected therewith adjacent its axis, the opposite end of the link being connected, by means of a turn buckle 91, with the front end of a second link 92, having its rear end pivotally connected with the harrow frame. When the harrow is lifted from the ground the hand lever 88 swings upward and forward about its axis to the position shown by dotted lines in Fig. 1, in which position the axes of the links 90 and 92 are in a line below the axis of the hand lever and the toggle mechanism is in a self-locking position against a stop lug 93, and will retain the harrow in an elevated position until the operator desires to lower the harrow by swinging the hand lever rearward to release the toggle mechanism from its locking position.

Motion is transmitted from the side shaft 69 of the tractor by means including a bevel gear 94 secured to the power shaft 8 and meshing with a corresponding gear 95 secured to the rear end of a coupling member 96 journaled in a bearing 97 forming part of an arm 98 turnable about the axis of the shaft 8, and the rear end of the shaft 99 is telescopically connected with the coupling member 96, and its front end provided with a universal coupling member 100 whereby it is operatively connected with the coacting coupling member 73 upon the rear end of the side shaft 69 of the tractor.

To support the harrow against a lateral swing relation to the tractor there is provided a loop member 101 secured to the frame 1 of the harrow that slidably receives the rear end of the draft frame 61 of the tractor in a manner whereby, when the harrow is raised or lowered, the rear end of the draft frame moves with it. The frame of the harrow is strong and rigid; the throw of the disks is in the same direction, and their angle relative to the line of draft is regulated by the hand wheel 39, and by means of which the throw of the disks may be reversed as desired. The pitch diameters of the several power transmitting gears may be proportioned to give any desired speed of rotation to the disks relative to the advance of the tractor. The disks rotate in the same direction as the traction wheel of the tractor and the power required to turn them in the soil assists in advancing the tractor.

Having shown and described an embodiment of my invention, I do not desire that it be limited to the details of the structure as illustrated, it being understood that many changes in the form, proportion and organization of its associated parts may be made without departing from the spirit of my invention as indicated in the scope of the appended claims.

What I claim as my invention, and desire to secure by Letters Patent, is:

1. In a tillage implement, in combination, a frame, tillage elements carried by said frame, draft members secured to said frame, a source of draft power including a rotatable axle having said draft members pivotally connected with opposite ends thereof, clutch elements mounted upon opposite ends of said axle and rotatable therewith, and cooperating clutch elements carried by said draft members and adapted to engage with said first clutch elements in a manner to turn said draft members about the axis of said axle.

2. In a tillage implement, in combination, a frame, tillage elements carried by said frame, draft members secured to said frame, a source of draft power including a rotatable axle having said draft members pivotally connected with opposite ends thereof, friction wheels mounted upon opposite ends of said axle and rotatable therewith, friction shoes carried by said draft members, and means for bringing said shoes into engagement with said friction wheels in a manner to turn said draft members about the axis of said axle.

3. In a tillage implement, in combination, a frame, tillage elements carried by said frame, draft members secured to said frame, a source of draft power including a rotatable axle having said draft members pivotally connected with opposite ends thereof, friction wheels mounted upon opposite ends of said axle and rotatable therewith, levers pivotally mounted upon said draft members, and friction shoes carried by said levers and adapted to engage with said friction wheels in a manner to turn said draft members about the axis of said axle.

4. In a tillage implement, in combination, a frame, tillage elements carried by said frame, draft members secured to said frame, a source of draft power including a truck frame and a rotatable axle having said draft members pivotally connected with opposite ends thereof, means for turning said draft members about the axis of said axle to lift the implement frame, and a toggle mechanism connecting the implement frame with the truck frame and operative to retain the implement frame in a raised position.

5. In a tillage implement, in combination, a frame, tillage elements carried by said frame, draft members secured to said frame, a source of draft power including a truck frame and a rotatable axle having said draft members pivotally connected with opposite ends thereof, means for turning said draft members about the axis of said axle to lift the implement frame, and toggle links connecting the implement frame with said truck frame and adapted to swing to a self-locking position when said implement frame is lifted to a predetermined plane.

6. In a tillage implement, in combination, a frame, tillage elements carried by said frame, draft members secured to said frame, a source of draft power including a truck frame and a rotatable axle having said draft members pivotally connected with opposite ends thereof, means for turning said draft members about the axis of said axle to lift the implement frame, toggle links connecting the implement frame with said truck frame and adapted to swing to a self-locking position when said implement frame is lifted to a predetermined plane, and a hand operable lever carried by one of said links for releasing said links from a locking position.

7. In a tillage implement, the combination with a tractor frame including a transverse shaft, of an implement frame having draft bars pivoted on said shaft, means actuated by tractive power for raising the implement frame by swinging said arms on the axis of said shaft, and combined locking and lowering means for the implement frame, comprising a hand lever pivoted on the tractor frame and a member connecting the lever and implement frame and connected to the lever at a point forming a toggle-lock therewith when the implement frame is in raised position.

8. In a tillage implement, the combination with a tractor frame including a transverse power driven shaft, of an implement frame having draft bars pivoted on said shaft, means for raising the implement frame by power from said shaft including a clutch element fixed on the driven shaft and a complemental clutch element carried on a lever pivoted on the draft bars, and combined locking and lowering means for the implement frame comprising a second lever pivoted on the tractor frame and a link connecting the lever and implement frame and connected to the lever at a point forming a toggle-lock therewith when the implement frame is in raised position.

9. In combination, a source of draft power, a ground treating unit, a draft connection between said power source and ground treating unit whereby the latter is propelled, means for raising the ground treating unit including a clutch member carried by the power source and another clutch member carried by the draft connection and means for locking in said raised position.

In testimony whereof I affix my signature.

EDWARD W. BURGESS.